United States Patent [19]
Johnson

[11] Patent Number: 5,131,794
[45] Date of Patent: Jul. 21, 1992

[54] DOG DRIVE FOR TAPPING ATTACHMENTS

[75] Inventor: Allan S. Johnson, Newport Beach, Calif.

[73] Assignee: Tapmatic Corporation, Irvine, Calif.

[21] Appl. No.: 724,546

[22] Filed: Jun. 27, 1991

[51] Int. Cl.⁵ .............................................. B23B 47/14
[52] U.S. Cl. ...................................... 408/139; 192/21; 192/51; 408/132; 470/181
[58] Field of Search ........... 10/129 R, 136 R, 136 TS, 10/89 F; 408/132, 134, 139, 141, 142; 192/21, 51, 46, 108; 74/376, 378

[56] References Cited

U.S. PATENT DOCUMENTS

| | | | |
|---|---|---|---|
| 2,493,059 | 1/1950 | Crafts | 192/21 |
| 3,041,893 | 7/1962 | Johnson | 10/136 R |
| 3,717,892 | 2/1973 | Johnson | 408/134 |
| 3,946,844 | 3/1976 | Johnson | 192/51 |
| 3,998,565 | 12/1976 | Tanaka | 74/376 |
| 4,277,209 | 7/1981 | Benjamin et al. | 408/139 |

Primary Examiner—Daniel W. Howell
Attorney, Agent, or Firm—Joseph R. Evanns

[57] ABSTRACT

A self-reversing tapping attachment employing dog drive includes driver means with at least one drive element for driving engagement with at least one dogging element on drive transmitting means, the dogging element and drive element being such that engagement between them is over an area greater than a point and further includes a drive spindle member for carrying a tap having at least one drive component for engagement with a dogging element on the drive transmitting means, the driver elements and dogging elements providing minimum interference between forward and reverse drive.

6 Claims, 3 Drawing Sheets

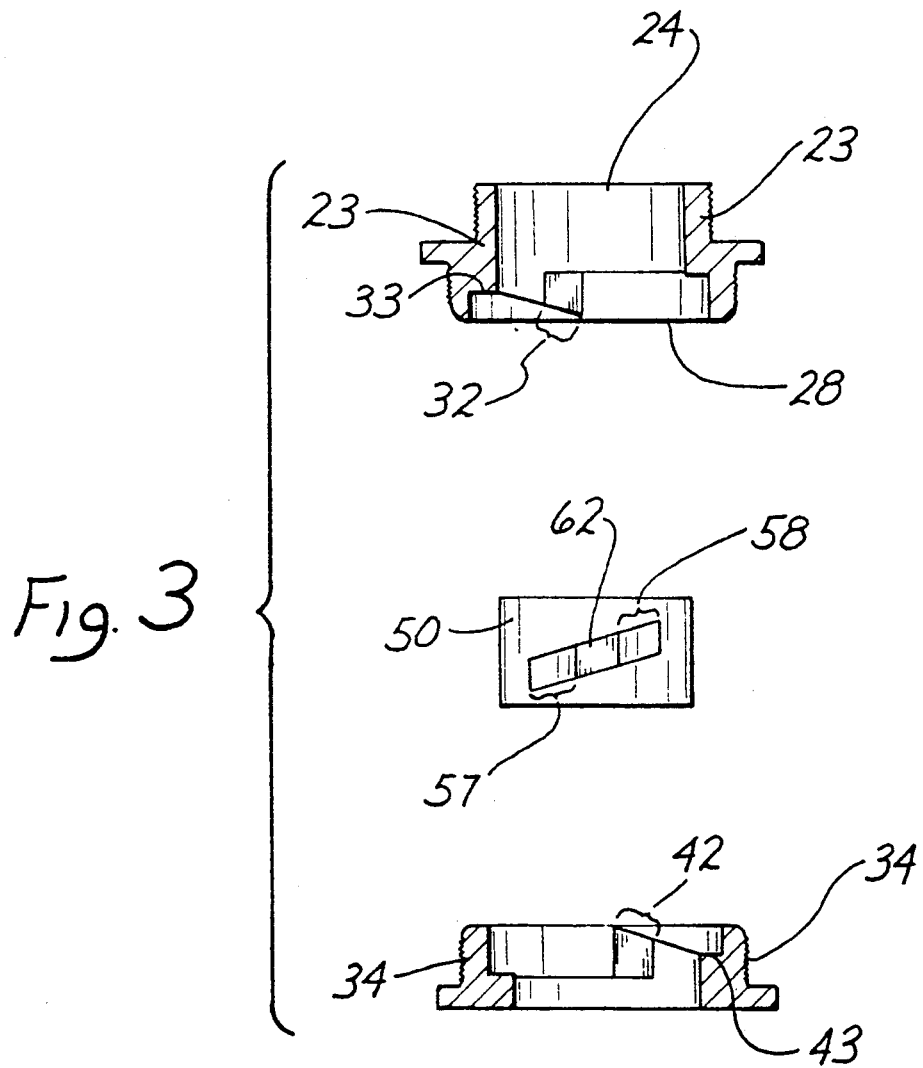

DOG DRIVE FOR TAPPING ATTACHMENTS

BACKGROUND OF THE INVENTION

1. Field of the Invention

The invention relates to improved dog driving arrangements in self-reversing tapping attachments, which are tools carrying taps for threading and are connectable to an external drive source such as a driving machine, the tapping attachment including means for reversing rotation of the tap.

2. Description of the Prior Art

Related patents to the same inventor as named on the application herein are U.S. Pat. Nos. 3,397,588; 3,472,347; 3,717,892; 3,946,844; 3,999,642; 4,014,421; 4,029,429; 4,067,424; and 5,011,344. The above-cited patents relate to provisions in tapping attachments for direct drive and for reverse drive as well as driving arrangements therein, among other things.

Tapping attachments have been extensively utilized in technology and industry for a lengthy period of time, and the field constitutes a well-developed art. With the advent, however, of Computer Numeric Control (CNC) of tapping operations and other instances of high-speed, high performance tapping, a need for improvement has become noticeable in particular with respect to self-reversing tapping attachments. Self-reversing tapping attachments are those which afford the capability of reverse rotation of a tap after it has reached the selected depth, for the purpose of facilitating its withdrawal from the hole which has been threaded by it.

One of the most common means for imparting rotation in existing tapping attachments is the dog drive. In a dog drive, drive is transmitted through a driver element to a drive spindle holding the tap, the driver element having drive dogs for engaging with the spindle and being driven by dogs or splines on forward and reverse driving members.

In existing dog drives impacts between the components and parts involved with driving, such as dogs and splines, cause shock and vibration resulting in wear of the machine elements. This is particularly pronounced in high speed applications such as those relating to CNC operations. In addition, in existing arrangements, particularly those relating to high speeds of rotation, there is a need for rapid change between forward and reverse modes of rotation. In existing tapping attachments, there are limitations with respect to such changing between rotational modes due to the configurations of the driving elements which due to their shape and size may interfere with one another during attempted shifting and clutching.

Therefore, there has been a felt but unfulfilled need for a dog drive in a tapping attachment whereby shock and wear within the driving and clutching elements are minimized, and providing facilitated shifting between forward and reverse modes of rotation.

SUMMARY OF THE INVENTION

A tapping attachment employing dog drive is provided including driver means having at least one drive element for driving engagement with at least one dogging element on a drive transmitting means, the dogging element and the drive element being configured and positioned such that engagement between them is over an area greater than a point, and further including a drive spindle member for carrying a tap and having at least one drive component for engagement with a dogging element on the drive transmitting means, the driver element and dogging elements and dogging elements being configured and positioned so as to minimize interference between forward and reverse drive.

BRIEF DESCRIPTION OF THE DRAWINGS

FIG. 3 is a detailed view of drive components and parts in accordance with the invention.

DESCRIPTION OF A PREFERRED FORM OF THE INVENTION AND PREFERRED METHOD OF PRACTICE.

The description of the apparatus which follows incorporates by reference the description and drawings in co-pending patent application Ser. No. 07/330,752 filed Mar. 30, 1989, now abandoned, and related continuation-in-part application Ser. No. 07/715,343, filed Jun. 14, 1991. As result of the incorporation by reference of the aforesaid patent applications, description of some components and arrangements of tapping attachments in which the invention of this application is incorporated, will be brief and will rely upon the above specified co-pending applications for detailed disclosure.

Figure 1:
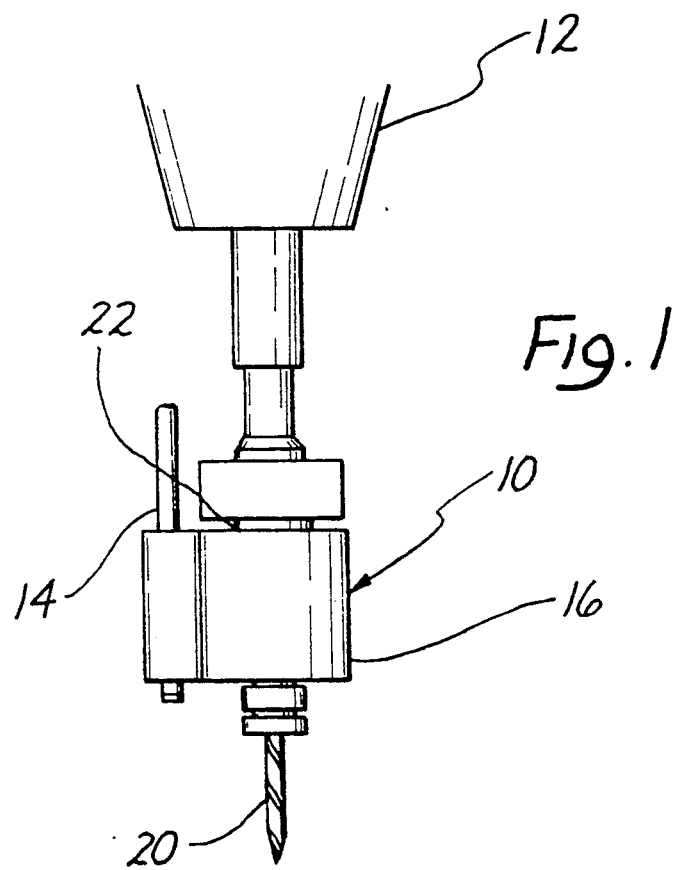
FIG. 1 is side view, somewhat simplified, of a tapping attachment including an improved dog drive in accordance with the invention, connected to a driving machine.

As depicted in FIG. 1, a tapping attachment 10 is connected to a dog drive source of rotational power in the form of a driving machine 12. A holding stem 14 (shown fragmentarily only) is at a side of the housing 16 of the tapping attachment 10 and is connectable in conventional fashion to the driving machine 12 to form a restraint preventing rotation of the housing 16 of tapping attachment 10.

A spindle member 18 extends outwardly of housing 16. At its upper end, spindle member 18 extends to driving machine 12. At the lower end of spindle member 18 a tap 20 is attached, the tap 20 being threaded so as to make threaded holes in workpieces (not shown) and including a central bore 21.

The above specified co-pending applications disclose in detail a tapping attachment in which driving dogs are utilized. The driving dog arrangement and components as disclosed and claimed herein are employable with the tapping attachment described in the applications co-pending. For brevity and clarity, overlap of the descriptions between the co-pending application and the instant application will be avoided to the extent possible.

Figure 2:
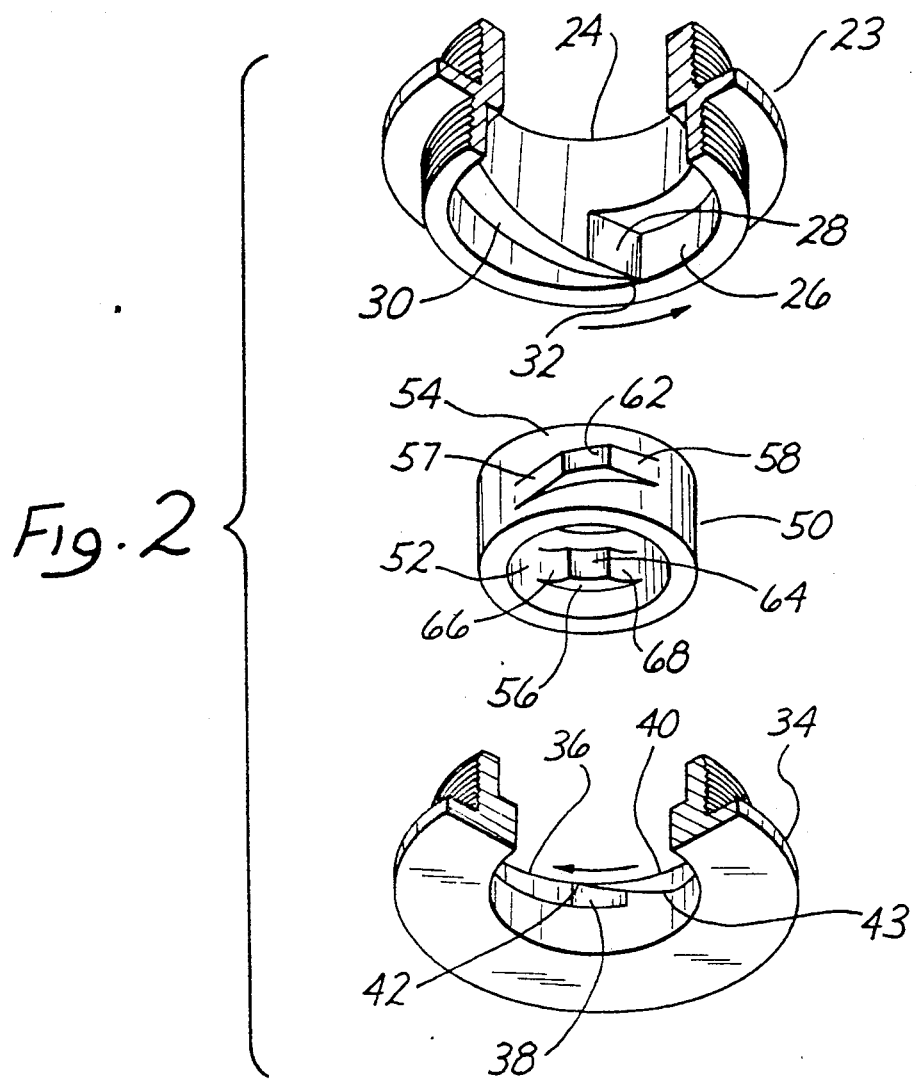
FIG. 2 is a sectional view of a tapping attachment including a preferred form of the invention.
Figure 4:
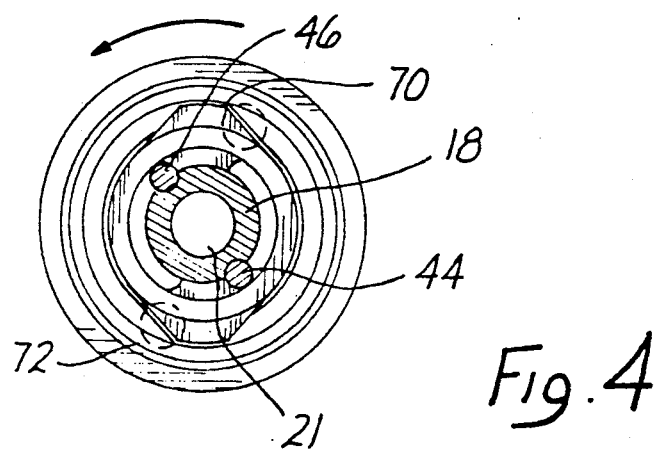
FIG. 4 is a detailed fragmentary view of drive parts and components in accordance with the invention.

In the co-pending applications, drive is effected by a forward drive member and a reverse drive member, with suitable provisions for producing reverse drive and shifting between forward and reverse drive. As is depicted in FIG. 2 herein, a forward driver member 23 is coupled to movable part 22 of tapping attachment 10 in the manner described in the co-pending applications, as is the connection of movable part 22 to the driving machine 12. Forward drive member 23 defines a central bore 24. Carried interiorly by forward drive member 23 is drive element 26. The latter is configured in the form of a flange or shoulder which extends along the inner wall of drive member 23. Drive element 26 defines a surface 28 which is contiguous with a second drive component in the form of an inclined plane or ramp 30. With ramp 30, surface 28 of drive element 26 forms a forward drive edge 32. Ramp 30 has at the opposite end from forward drive edge 32 a substantially planar region 33 which as depicted in FIG. 4 has the form of a plateau at the top of the incline 30.

A reverse drive member 34 is coupled to gears for reverse drive in the same manner as reverse drive members shown and described in the co-pending applications.

Reverse drive member 34 is positioned axially below forward drive member 23 and carries drive elements at the upper part of the interior of its peripheral wall as opposed to the comparable drive elements in the forward drive member 23 whose driving elements as above described are at the lower part of the annular configuration of drive member 23. In this discussion, the terms "upper" and "lower" refer to being either in an axial direction away from the tap 20 ("upper") or toward the tap 20 ("lower").

In the same manner as with the forward drive member 23, reverse drive member 34 defines at its inner wall a drive spline 36 in the form of a protruding shoulder and has a contact surface 38 at a point at which it intersects a ramp or incline 40. The intersection of spline 36 and incline 40 forms a reverse drive edge 42. Similarly to forward drive member 23, incline 40 has a substantially planar region 43 at the opposite end of its intersection with shoulder 38 to form edge 42. The function of planar regions 33, 43 is to provide additional area and length for impact in driving engagement between the respective drive members and a drive transmittal means 50 which in turn transmits drive to spindle member 18 as described hereinbelow.

As described in the co-pending applications, spindle member 18 is equipped with splines for the purpose of transmittal of drive thereto; however, in accordance with the present invention, the spindle 18 member utilizes drive pins 44, 46 (depicted in FIG. 4) for the purpose of transmittal of drive to spindle member 18. Pins 44, 46 are of cylindrical configuration with a circular cross-section.

Drive transmittal means 50 is in the form of a dog ring, which defines a central bore 52 and is of generally annular configuration. Disposed upon dog ring 50 are at least one outer driving dog member 54 and at least one inner driving dog member 56. Driving dog member 54 is disposed upon the outer surface of driving ring 50. In the discussion herein, the terms "inner" and "outer" shall mean and refer to directions perpendicular to spindle member 18 and shall, respectively, refer to the direction from the spindle member 18 toward the housing 16 ("outer") and the direction from the housing 16 toward the spindle member 18 ("inner").

Driving dog members 54, 56 are positioned and configured to reduce shock and wear to driving parts caused by engagement for driving purposes of the dogs with the respective components with which they impact for the purpose of imparting rotational drive to the tap 20 held by the spindle member 18.

Dog member 54 is in the form of a triangular polyhedron protruding radially outwardly from the outer surface of dog ring 50, with a substantially planar region where the external vertex of the triangular polyhedron would otherwise be located. The driving dog 54 as depicted is disposed at an angle substantially equal to forty-five degrees (45°) to a tangent to the dog ring 50 perpendicular to the axis of rotation of the dog ring (which axis of rotation is coincident with the direction of spindle member 18.

The configuration of driving dog member 54 is described as two inclined planes in the form of ramp elements 57, 58 each intersecting the substantially planar or flattened region 62.

The configuration and disposition of inner driving dog member 56 is similar to that of outer driving dog member 54. Inner driving dog member 56 is in the form of a triangular polyhedron with a flattened or substantially planar region 64 where the vertex would be located in a triangular polyhedron. Inclined ramp elements 66, 68 intersect area 64 in the same manner as in the case of driving dog member 54. In like manner the orientation of driving dog member 56 is inclined at an angle of substantially forty-five degrees (45°) to the same tangent to the dog ring 50 as is dog member 54.

As depicted in FIG. 4, the tapping attachment 10 is in reverse drive. As described and depicted in the co-pending applications, changes between the forward mode of rotation and the reverse mode of rotation are accomplished by means of axial motion of drive transmitting means therein (in this case drive transmitting means 50) between the engaged positions with the forward and reverse drive members, respectively. In the same manner, change between the forward and reverse drive mode is accomplished in accordance with the present invention.

As stated above, reverse rotation is utilized when the tap 20 will have threaded a hole in the work piece to a selected depth, at which time the tapping machine will be lifted under either CNC control or manually. At this point the tap 20, together with spindle member 18, is to be retracted from the hole; however, due to the fact that the tap in effect has screwed itself into the hole, it is necessary that the reverse mode of rotation be effected in order to retract tap 20 together with spindle member 18 from the hole. As described in detail in the co-pending applications, structures and arrangements in the tapping attachment described in the co-pending applications provide for relative axial motion of the drive transmitting means with respect to the spindle and with respect to the reverse and forward drive members.

As a result of such relative axial motion, reverse rotation is accomplished when the dog ring 50 is engaged with reverse drive member 34.

As depicted in FIG. 4, in the reverse mode of rotation drive pins 44, 46 of drive spindle member 18 are engaged with dog member 56 of dog ring 50, and in such engagement, the ramp surfaces 66, 68 are in contact with the drive pins 44, 46. Concurrently, dog member 54 of dog ring 50 is in driving engagement with drive elements 38, 43 of reverse drive member 34. As shown in FIG. 4, in form of dotted circles 70, 72, the only interference prints in three hundred sixty degrees (360°) relative to motion of the dog ring 50 between forward and reverse rotational modes, are as indicated. This is due to the configurations depicted and described of the drive elements 38, 43 of reverse driving member 34, of dog member 54 on dog ring 50, and driving elements 26, 30 of forward drive member 23. Thus, due to the substantial lack of interference relative to movement between forward and reverse drive modes the precision of operation of tapping attachments incorporating drive elements in accordance with the invention is enhanced, due to the relative rapidity and readiness with which the tapping attachment can shift between the forward and reverse modes to withdraw the tap 20 from the threaded hole.

The same considerations are applicable with respect to forward drive member 23 as with respect to reverse drive member 34 relative to potential interference between the driving elements of the drive member and the driving elements of drive transmitting means 50. Thus, due to the configuration and orientation of the driving elements on the respective drive components, there are two (2) potential points of interference within the three hundred sixty degrees (360°) of the circular contact area. As noted, this lends itself to precise operation with respect to retraction of a tap from a threaded hole.

Besides the above mentioned advantage of precision and rapidity of operation relative to insertion and extraction of the tap 20 from a threaded hole, the configuration and orientation of the driving elements and components in accordance with the invention have the added advantage of reducing shock and wear on the driving components with respect to the collisions and impacts resulting from driving engagement among the various driving elements. The inclined orientation of the dog members on dog ring 50 as well as the configuration of the driving elements, together with the orientation and configuration of the driving elements in forward drive member 23 and in reverse drive member 34, result in substantially less shock and therefore wear in connection with engagement among the respective components. Also contributing to this advantage on the same basis is the configuration of drive pin 78. This is due to the fact that there is a relatively extended impact surface, as well as an offset position in contrast to impact surfaces in existing devices. For example, engagement in reverse drive mode as depicted in FIG. 4 occurs when the slanted inclined surfaces 66, 68 impact drive pins 44, 46 of spindle member 18. This impact is distributed as to force and shock across and appreciable length and quantity of material thus spreading out the force of the impact with less resulting stress upon she respective parts involved in the driving engagement.

Similarly, the relatively lengthy contact between dog member 54 together with its respective segments 57, 58, 62, and the internal driving elements 38, 43 of reverse drive member 34 result in a distribution of force and shock reducing the deteriorative effect thereof upon the elements involved. Similar considerations apply, of course, to engagement in forward drive. Therefore, in accordance with the invention precision of operation of tapping attachments is enhanced and longevity of driving components is improved.

The foregoing is descriptive and illustrative, the invention being defined by the appended claims interpreted in light of the specification.

What is claimed is:

1. In a self-reversing tapping attachment including a dog drive the improvement comprising:
   (a) driver means connectable to a source of rotational power, said driver means comprising a forward drive member and a reverse drive member, said forward drive member including at least one forward drive element and said reverse drive member including at least one reverse drive element;
   (b) substantially annular rotatable drive transmitting means having an axis of rotation and carrying at least one dogging element extending generally radially therefrom and engageable upon axial movement of said drive transmitting means with said at least one forward drive element and said at least one reverse drive element of said drive means, said at least one dogging element being inclined at an acute angle to said axis of rotation, and at least one of said forward drive element and said reverse drive element having an incline portion inclined with respect to said axis of rotation such that driving engagement between said at least one dogging element and said at least one drive element of said driver means id over an area larger than a point and interference between said at least one drive element and said at least one dogging element is at not more than two points, whereby shock and vibration of engagement and disengagement are reduced.

2. The invention as set forth in claim 1 wherein said at least one forward drive element of said driver means includes said incline portion.

3. The invention as set forth in claim 1 wherein said at least one reverse drive element of said driver means includes said incline portion.

4. The invention as set forth in claim 1 wherein said at least one dogging element on said drive transmitting means is configure substantially as a triangular polyhedron.

5. The invention as set forth in claim 4 wherein said triangular polyhedron includes two sides extending generally outwardly from said drive transmitting means, and a substantially planar region intersecting said sides.

6. The invention as set forth in claim 4 wherein said acute angle is substantially equal to forty-five degrees (45°).

* * * * *